United States Patent
Aoki et al.

(10) Patent No.: US 6,279,152 B1
(45) Date of Patent: Aug. 21, 2001

(54) APPARATUS AND METHOD FOR HIGH-SPEED MEMORY ACCESS

(75) Inventors: Masaki Aoki, Kawasaki; Masahito Morishima, Shizuoka, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/077,870

(22) PCT Filed: Oct. 20, 1997

(86) PCT No.: PCT/JP97/03784

§ 371 Date: Jun. 4, 1998

§ 102(e) Date: Jun. 4, 1998

(87) PCT Pub. No.: WO98/18084

PCT Pub. Date: Apr. 30, 1998

(30) Foreign Application Priority Data

Oct. 18, 1996  (JP) .................................................. 8-276617

(51) Int. Cl.[7] ........................................................ G06F 9/45
(52) U.S. Cl. .................................................... 717/9; 717/5
(58) Field of Search ............................. 395/706, 500.43, 395/707, 705; 365/230.03, 189.07, 230.04; 707/2; 711/110; 712/14; 703/22; 717/7, 5, 9

(56) References Cited

U.S. PATENT DOCUMENTS

| | | | | |
|---|---|---|---|---|
| 5,010,522 | * | 4/1991 | Ashmore, Jr. .................. | 365/189.07 |
| 5,274,820 | * | 12/1993 | Gillet ........................ | 717/5 |
| 5,305,281 | * | 4/1994 | Lubeck ...................... | 365/230.04 |
| 5,404,531 | * | 4/1995 | Wakatani .................... | 717/7 |
| 5,485,597 | * | 1/1996 | Yamamoto ................... | 711/110 |
| 5,721,928 | * | 2/1998 | Umehara et al. ............. | 717/6 |
| 5,799,183 | * | 8/1998 | Iwashita ..................... | 707/2 |
| 5,805,863 | * | 9/1998 | Chang ........................ | 703/22 |
| 5,835,436 | * | 11/1998 | Ooishi ....................... | 365/230.03 |
| 5,842,035 | * | 11/1998 | Nishikawa ................... | 712/14 |

FOREIGN PATENT DOCUMENTS

| | | | |
|---|---|---|---|
| 4-262458 | * | 9/1992 | (JP) .................. G06F/9/45 |
| 6-274351 | * | 9/1994 | (JP) .................. G06F/9/45 |
| 8-171554 | * | 7/1996 | (JP) .................. G06F/9/45 |

OTHER PUBLICATIONS

Nam–Henschen teach Compiling Recursive Prolog Programs with List Structure into Procedural Languages, Computer Software and Applications Conference, 1991. COMPSAC' 91, Proceedings of the Fifteenth Annual International, IEEE, Sep. 1991.*

Rodgers–Page, An efficient list representation and access scheme for artificial intelligence applications, IEEE 1998, Apr. 1998.*

* cited by examiner

Primary Examiner—Kakali Chaki
Assistant Examiner—Hoang-Vu Antony Nguyen-Ba
(74) Attorney, Agent, or Firm—Staas & Halsey LLP

(57) ABSTRACT

When a processing unit of a vector computer detects an optimization directive line for optimizing a list accessing method during the compilation, an access method is automatically changed according to an instruction of the directive line. For example, data to be accessed are copied to a work array, the access order is changed at random, and a scalar load process is performed. As a result, high-speed list access can be realized without a bank conflict at a vectorization.

15 Claims, 25 Drawing Sheets

```
SUBROUTINE SUB(A,B,LIST,N)
INTEGER,DIMENSION (N)::A,B,LIST
!ocl list_copy(4,A)
DO I=1,N
B(I)=A(LIST(I))
ENDDO
RETURN
END
```

FIG. 4

```
       SUBROUTINE SUB(A,B,LIST,N)
       INTEGER,DIMENSION (N)::A,B,LIST
       INTEGER,DIMENSION (SIZE,4) ::WORK   ——RESERVING WORK ARRAY
(1)
(2)    WORK(1:N+0,1)=A          ← COPY 1 TO WORK ARRAY
(2)    WORK(2:N+1,2)=A          ← COPY 2
(2)    WORK(3:N+2,3)=A          ← COPY 3
(2)    WORK(4:N+3,4)=A          ← COPY 4
       DO I=1,N
(3)    L=MOD(I,4)
(4)    B(I)=WORK(LIST(I)+L,L+1)   ——REFERENCE FROM WORK ARRAY
       ENDDO
       RETURN
       END
```

F I G. 5

```
SUBROUTINE SUB(A,B,LIST,N)
INTEGER,DIMENSION (N)::A,B,LIST
INTEGER,DIMENSION (SIZE,4) ::WORK

WORK(1:N+0, 1) =A
WORK(2:N+1, 2) =A
WORK(3:N+2, 3) =A
WORK(4:N+3, 4) =A
LIST(1:N)=MOD(I,4)
B(1:N)=WORK(LIST(1:N)+L(1:N),L(1:N)+1)
RETURN
END
```

F I G. 6

LIST(1) = 1
LIST(2) = 3
LIST(3) = 1

FIG. 7

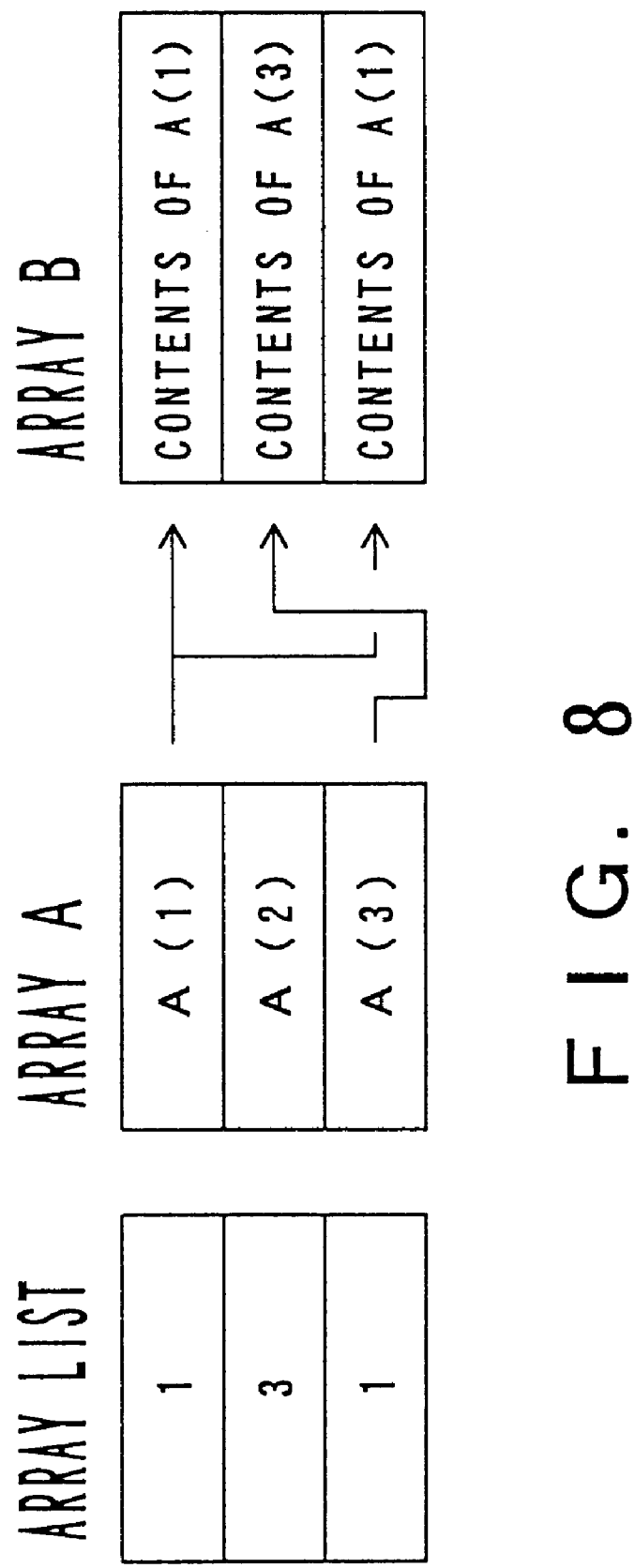
F I G. 8

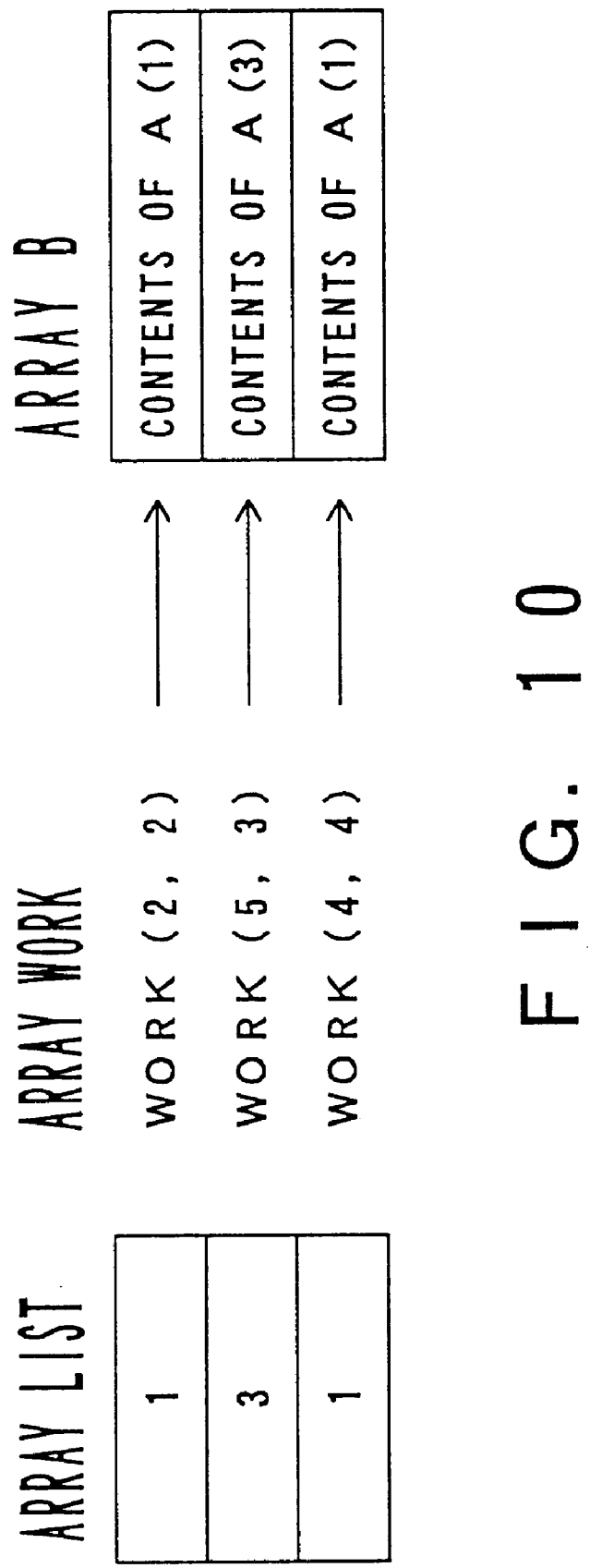
F I G. 1 0

FIG. 11

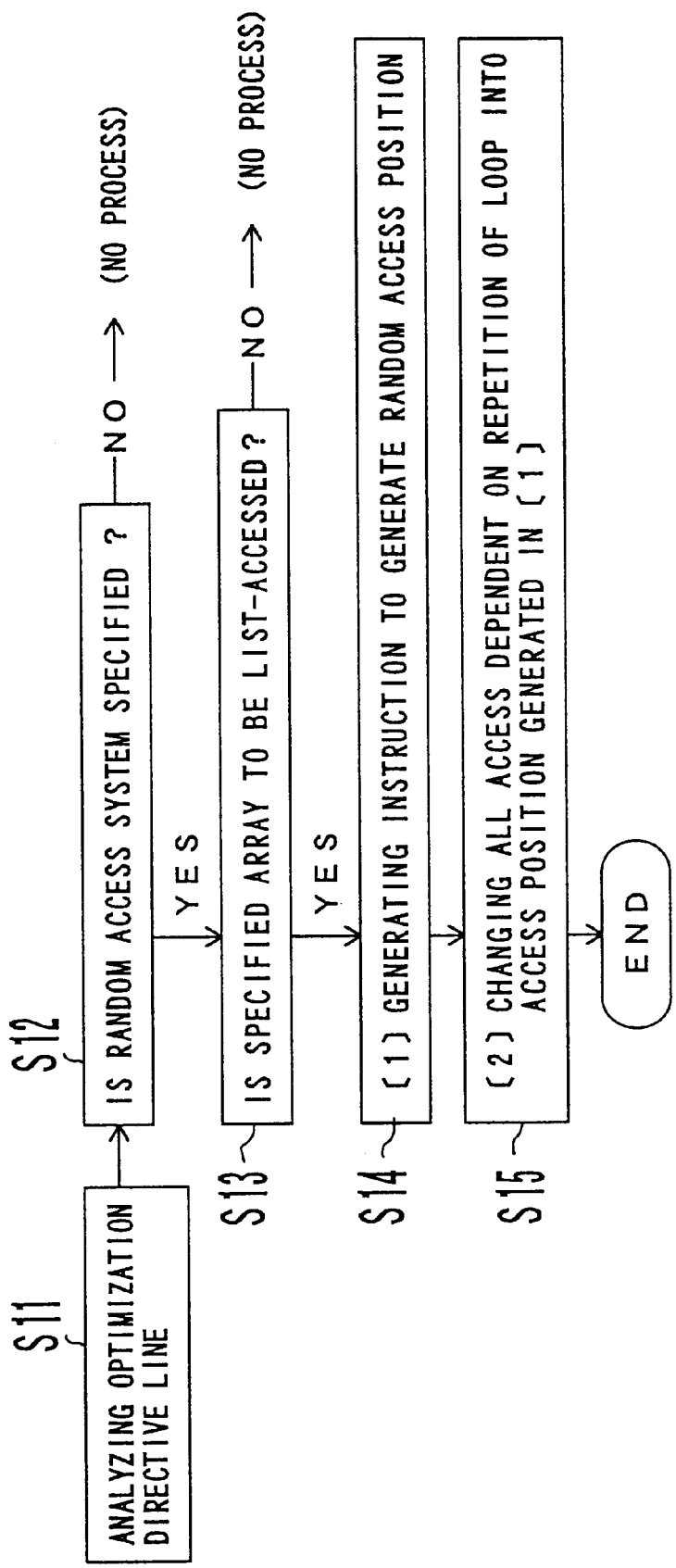
F I G. 1 2

```
SUBROUTINE SUB(A,B,L,N)
INTEGER,DIMENSION (N)::A,B,L
!ocl list_random(B)
DO I=1,N
A(I)=B(L(I))
ENDDO
RETURN
END
```

FIG. 13

```
SUBROUTINE SUB(A,B,L,N)
INTEGER,DIMENSION(N)::A,B,L
DO I=1,N
(1)   IRANDOM=RANDOM(I,N)        → GENERATION FUNCTION FOR RAMDOM ACCESS POSITION
(2)   A(IRANDOM)=B(L(IRANDOM))   → ACCESS AT RANDOM ACCESS POSITION
ENDDO
RETURN
END
```

F I G. 1 4

```
SUBROUTINE SUB(A,B,L,N)
INTEGER,DIMENSION (N)::A,B,L
IRANDOM(1:N)=RANDOM(1,N)
A(IRANDOM(1:N))=B(L(IRANDOM(1:N)))
RETURN
END
```

FIG. 15

```
SUBROUTINE SUB(A,B,L,N)
INTEGER,DIMENSION (N)::A,B,L
!ocl list_vls(B)
DO I=1,N
A(I)=B(L(I))
ENDDO
RETURN
END
```

FIG. 17

```
      SUBROUTINE SUB(A,B,L,N)
      INTEGER,DIMENSION(N)::A,B,L
(1)   t=B(1)                          SCALAR-LOADING WITH ALL LIST VALUES ASSUMED TO BE 1
      DO I=1,N
(2)   VR(I)=t                         TRANSFER TO VECTOR DATA
(3)   if(L(I).ne.1) VR(I)=B(L(I))     EXCEPTION PROCESS
(4)   A(I)=VR(I)
      ENDDO
      RETURN
      END
```

F I G. 1 8

```
     SUBROUTINE SUB(A,B,L,N)
     INTEGER,DIMENSION(N)::A,B,L
(a)  t=B(1)
(b)  VR(1:N)=t
(c)  mask(1:N)=L(1:N).ne.1
(d)  VR(1:N)=B(L(1:N));mask(1:N)
(e)  A(1:N)=VR(1:N)
     RETURN
     END
```

F I G. 1 9

| L(1) | L(2) | L(3) | L(4) | L(5) | L(6) | L(7) | L(8) |
|---|---|---|---|---|---|---|---|
| 1 | 1 | 1 | 2 | 1 | 1 | 1 | 3 |

| B(1) | B(2) | B(3) | B(4) | B(5) | B(6) | B(7) | B(8) |
|---|---|---|---|---|---|---|---|
| 1 | 2 | 3 | 4 | 5 | 6 | 7 | 8 |

F I G. 2 0

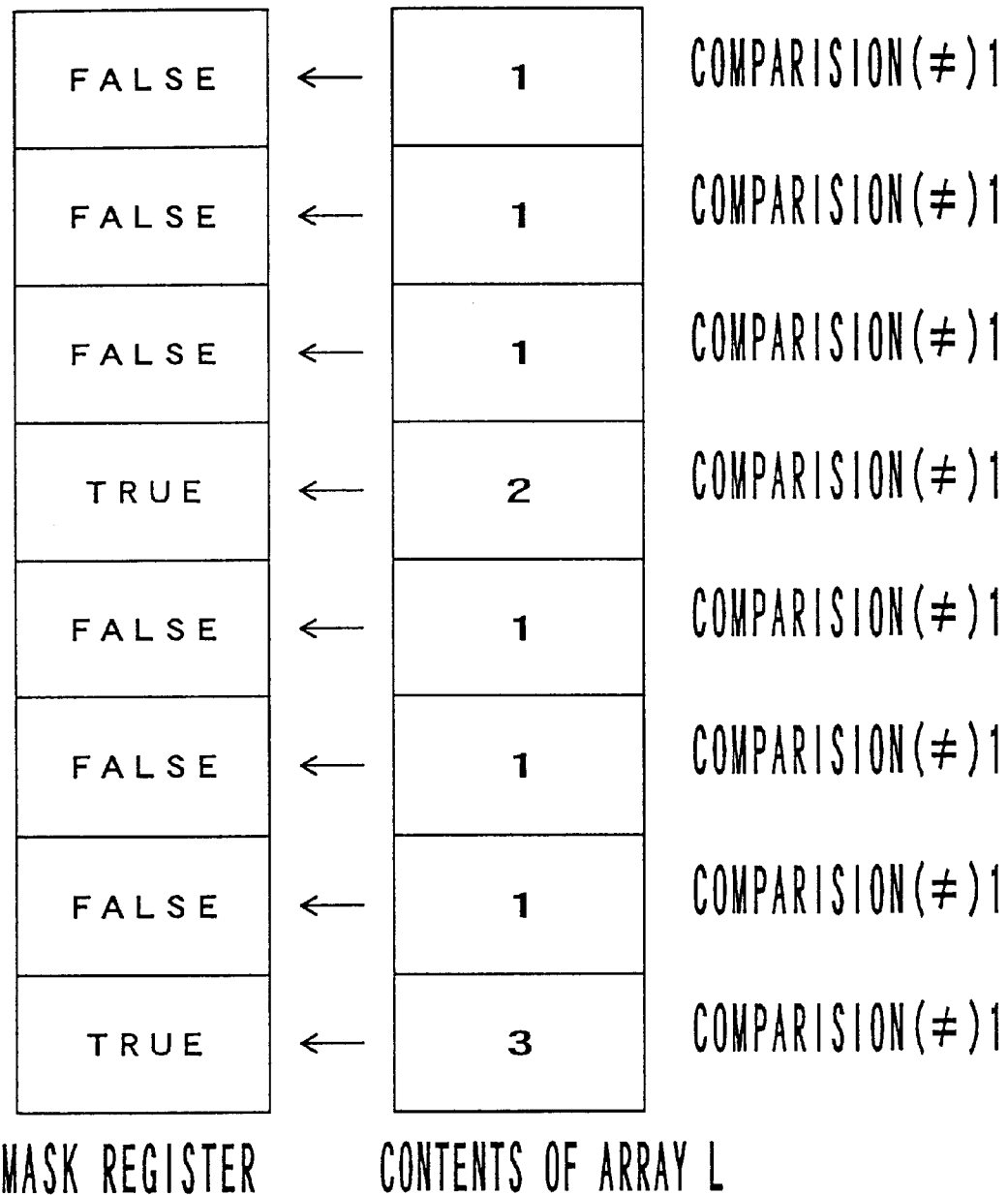
F I G. 2 3

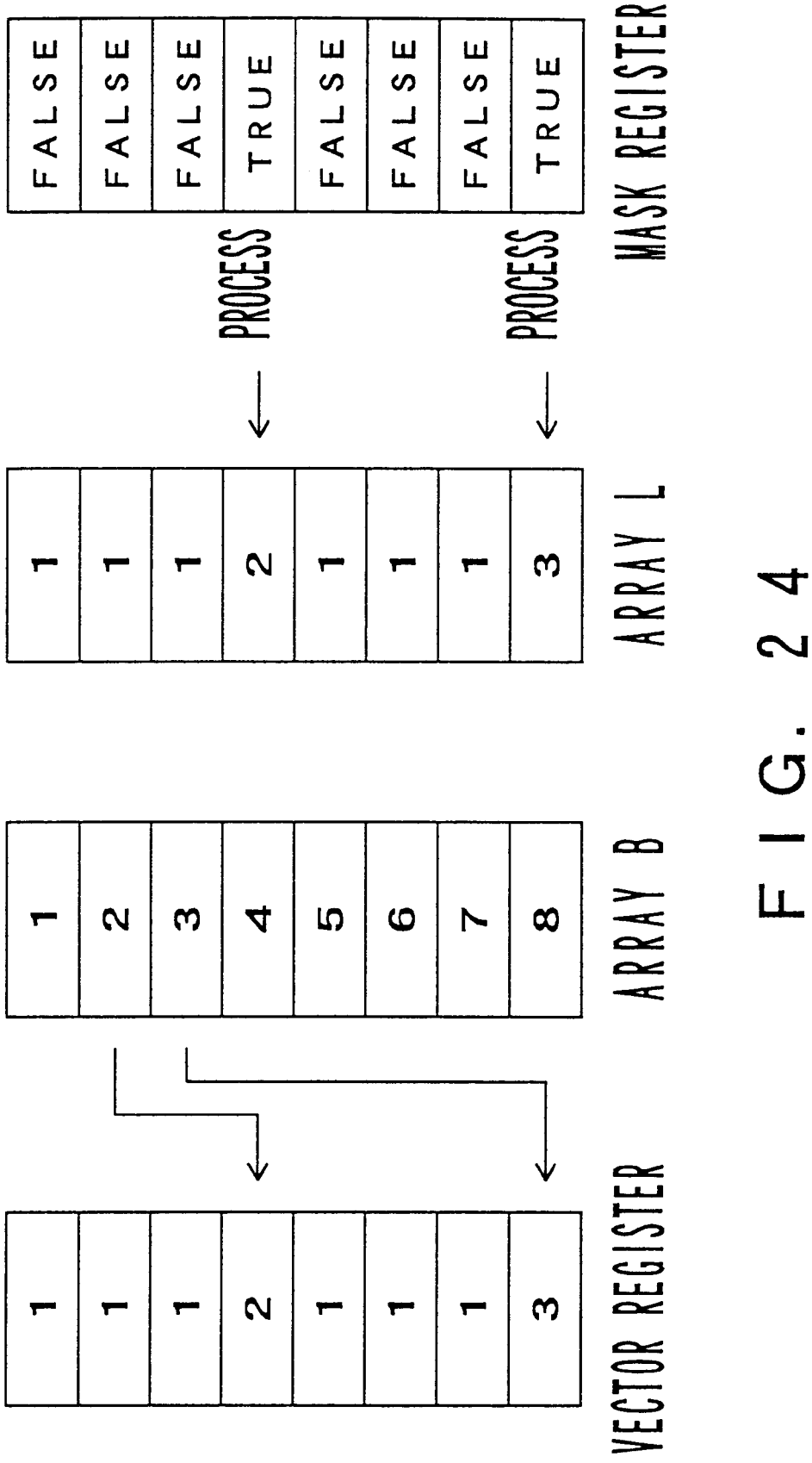
F I G. 24

APPARATUS AND METHOD FOR HIGH-SPEED MEMORY ACCESS

TECHNICAL FIELD

The present invention relates to an apparatus and method for realizing high-speed memory access.

BACKGROUND ART

Conventionally, the accessibility to memory is an important factor of the performance of a program when computation for science and/or technology is performed by a vector computer.

A vector computer gains access to memory in the following methods.

(1) Consecutive access: For example, the following source program (Fortran source) is executed.

do i=1, 10
a(i)=b (i)
enddo

In this case, an array a and an array b are consecutively accessed by DO index i.

(2) Access with distance: For example, the following source program (Fortran source) is executed.

do i=1, 10, 2
a(i)=b(i)
enddo

In this case, an array a and an array b are accessed with a distance of two using a DO index i.

(3) List access: For example the following source program (Fortran source) is executed.

do i=1, 10
a(list (i))=b(list (i))
enddo

In this case, an array a and an array b are accessed at random using a value of a list array 'list'.

The above described access methods can be arranged in the order of (1), (2), and (3) from the highest efficiency (speed). That is, the consecutive access is the highest method, and the list access is the slowest method. One of the most important objects in tuning a source program is to change a given source program into an algorithm for high-speed memory access.

However, the slowest list access method (3) cannot avoid appearance in a program algorithm, and cannot be changed into access such as the access (1) and (2).

With memory in which an address is assigned in an interleave system, there often arises a phenomenon of a bank conflict in which a plurality of access requests are transmitted to a memory bank within a predetermined time. When a bank conflict arises in list access, the access speed largely depends on a list pattern. When access concentrates on a single bank and competition occurs, the access time may be several ten times a normal value.

DISCLOSURE OF THE INVENTION

The present invention aims at realizing high-speed list access without user's tuning a source program and a bank conflict in a memory.

According to the present invention, an optimization directive line is described in the source program to optimize an access method of list access during the compilation. By describing the optimization directive line, a bank conflict can be avoided by copying data to be accessed to a work array, changing an access order at random, scalar loading, etc.

FIG. 1 shows the configuration of a processing unit according to the present invention. In FIG. 1, a source program 1 is a source program to be processed for higher-speed memory access.

A processing unit 2 includes a program input unit 3, a source analysis unit 4, a vector process unit 6, a code generation unit 9, etc., and performs various processes according to a program.

The program input unit 3 provides an input source program 1 for the source analysis unit 4.

The source analysis unit 4 includes an optimization control line analysis unit 5 for analyzing an optimization control line (optimization directive line), etc., and analyzes the source program 1.

The vector process unit 6 includes a vectorization unit 7 for vectorizing instructions, a changing unit 8 for changing list vector access, etc. and performs a vectorizing process.

The code generation unit 9 generates a code to convert a program into an executable object program 10.

Described below are the operations of the optimization control line analysis unit 5 and the changing unit 8.

When the optimization control line analysis unit 5 detects that an optimization directive line for changing a method of list access is inserted in the source program 1, the changing unit 8 changes subsequent list accesses to an access method specified in the optimization directive line. The changing method can be one of the following three methods.

When the optimization control line analysis unit 5 detects an optimization directive line in the source program 1, the changing unit 8 generates and inserts an instruction to copy a target array to be list-accessed to a work array, generates and inserts an instruction to determine the access position of the work array based on the list value of the list access, and changes the list access to the target array into access using the work array.

When the optimization control line analysis unit 5 detects an optimization directive line in the source program 1, the changing unit 8 generates and inserts an instruction to generate a random access position, and changes all access dependent on the repetition of a loop during the list access into the generated access position.

When the optimization control line analysis unit 5 detects an optimization directive line in the source program 1, the changing unit 8 generates and inserts a scalar instruction to load the leading position of a target array, generates and inserts an instruction to transfer the loaded scalar data to vector data of list access, and generates and inserts an instruction string using the transferred vector data.

Furthermore, a storage medium for storing a program which performs the above described processes can be generated, and the program can be loaded from the storage medium to the processing unit 2 to be executed.

Thus, list access can be converted into an appropriate access method by performing a compiling process based on the description of an optimization directive line. Therefore, high-speed list access can be realized without user's tuning a source program and a bank conflict.

BRIEF DESCRIPTION OF THE DRAWINGS

FIG. 4 shows an example of a source program in the array copy method;

FIG. 5 shows an example of an implement in the array copy method;

FIG. 6 shows an example of vector execution in the array copy method;

FIG. 7 shows a value of an array LIST;

FIG. 8 shows memory access before a change;

FIG. 10 shows memory access after a change;

FIG. 11 shows an example of accessing the same bank;

FIG. 12 is a flowchart showing the operations in the random access method;

FIG. 13 shows an example of a source program in the random access method;

FIG. 14 shows an example of an implement in the random access method;

FIG. 15 shows an example of vector execution in the random access method;

FIG. 17 shows an example of a source program in the scalar load method;

FIG. 18 shows an example of an implement in the scalar load method;

FIG. 19 shows an example of vector execution in the scalar load method;

FIG. 20 shows values of an array L and an array B;

FIG. 23 shows generation of a mask;

FIG. 24 shows an exception process; and

BEST MODE OF CARRYING OUT THE INVENTION

The embodiments and operations according to the present invention are sequentially described in detail by referring to FIGS. 1 through 25.

Figure 1:
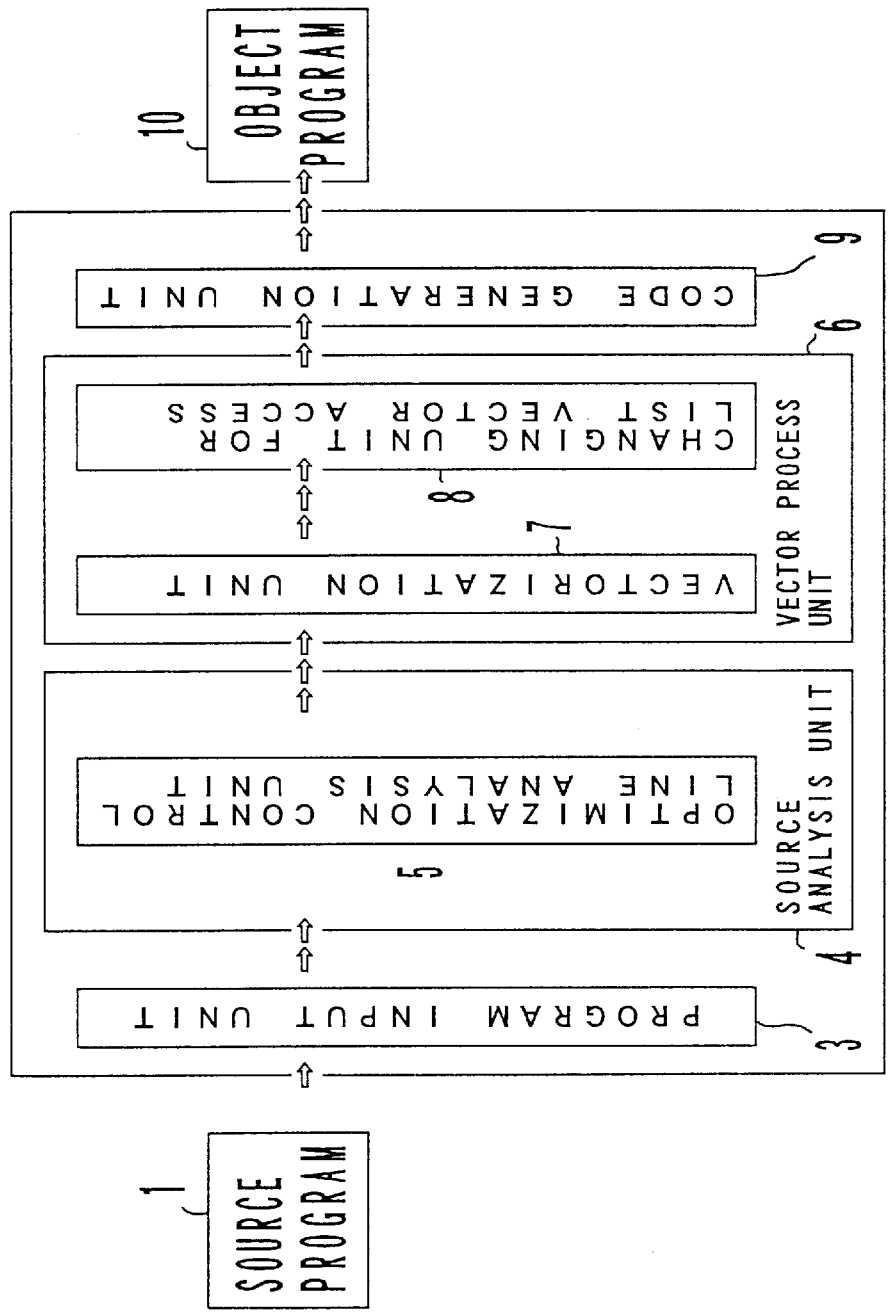
FIG. 1 shows the configuration of the processing unit according to the present invention.

The source program 1 shown in FIG. 1 is a target program for accessing memory at a high speed as described in the example of a source program shown in FIG. 3 and described later.

The processing unit 2 comprises a CPU (central processing unit), memory, etc., and performs various processes according to a program.

The source analysis unit 4 comprises the optimization control line analysis unit 5 for analyzing an optimization directive line, and analyzes the source program 1.

The vector process unit 6 comprises the vectorization unit 7, the changing unit 8, etc., and performs a vectoring process.

The changing unit 8 adds to a program a process of copying a target array to a work array, a process of changing an access order at random, or a scalar load process.

The code generation unit 9 generates a code and converts a program into the object program 10 in an executable format.

The CPU of the processing unit 2 performs the above described processes by executing a compiler program using memory, and generates the object program 10 from the source program 1.

Figure 2:
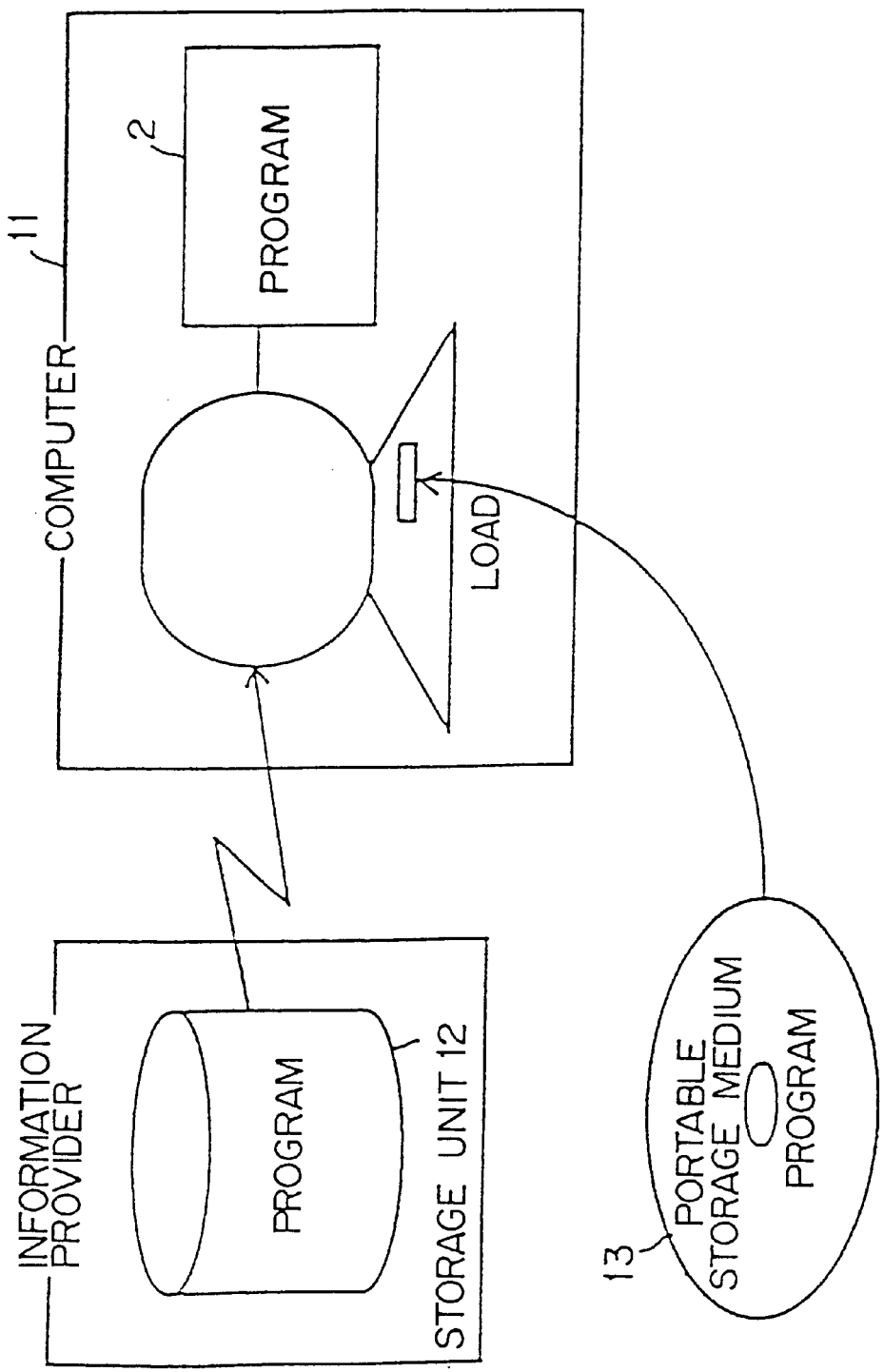
FIG. 2 shows storage media.

FIG. 2 shows a computer-readable storage medium capable of providing a program for a computer 11 containing the processing unit 2. A program stored in a storage unit 12 of an information provider or a portable storage medium 13 is loaded onto the processing unit 2 and executed.

The storage unit 12 can be, for example, a magnetic disk device, an optical disk device, a magneto-optical disk device, -etc., and is connected to the computer 11 through a bus or a line.

The portable storage medium 13 can be an arbitrary computer-readable storage medium such as a memory card, a floppy disk, CD-ROM (compact disk read only memory), an optical disk, magneto-optical disk, etc.

Next, a method of avoiding a bank conflict in the array copy method is described in detail by referring to FIGS. 3 through 10.

Figure 3:
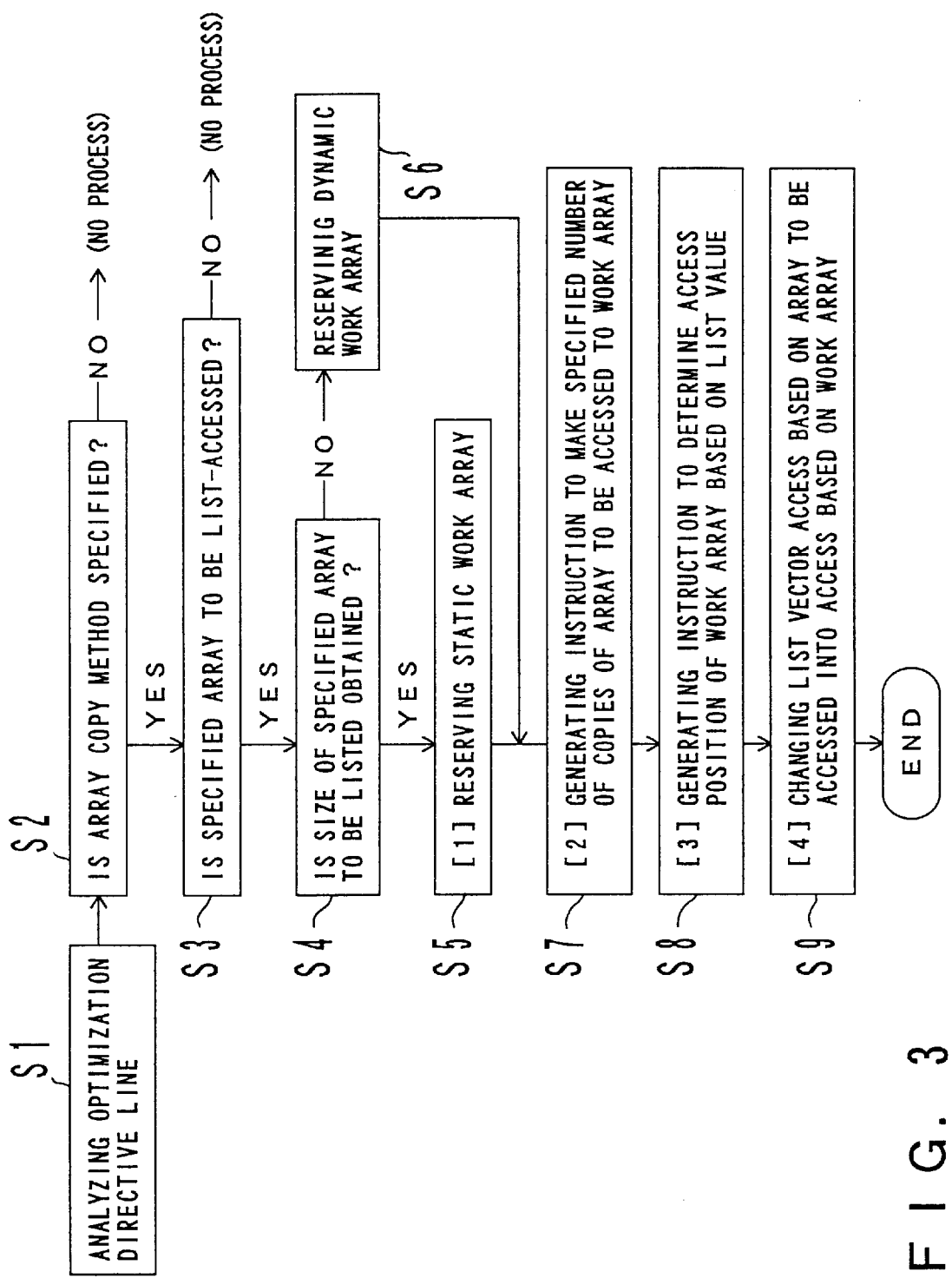
FIG. 3 is a flowchart showing the operations in the array copy method.

FIG. 3 is a flowchart showing the operations of the array copy method according to the present invention.

In FIG. 3, the optimization control line analysis unit 5 analyzes an optimization directive line in step S1. For example, it is checked whether or not there is the following optimization directive line representing the array copy method described on the third line of the source program shown in FIG. 4.

!ocl list_copy (4,A)

The optimization directive line is described as a comment statement, and indicates an array copy process for making four copies of an array A.

In step S2, the optimization control line analysis unit 5 determines whether or not the array copy method is specified. If yes, control is passed to step S3. If not, the process terminates without performing any process.

In step S3, the optimization control line analysis unit 5 determines whether or not the access to a specified target array refers to list access. In this example, it is determined whether or not the description of the access to an array in the array copy method specified in step S2 refers to the list access. If yes, control is passed to step S4. If not, the process terminates without performing any process.

In step S4, the changing unit 8 determines whether or not the size of an array can be specified. If yes, the size of the array to be specified can be determined, and therefore a static work array is reserved in step S5 ([1]) (corresponding to [1] shown in FIG. 5), and control is passed to step S7. If not, a dynamic work array is reserved in step S6, and control is passed to step S7.

In step S7 ([2]), the changing unit 8 generates an instruction to make a specified number of copies of a target array to a work array (corresponding to [2] shown in FIG. 5).

In step S8 ([3]), the changing unit 8 generates an instruction to determine the access position of a work array based on a list value (corresponding to [3] shown in FIG. 5).

In step S9 ([4]), the changing unit 8 changes list vector access based on a target array into access based on a work array (corresponding to [4] shown in FIG. 5).

In the above described processes, an optimization directive line (for example, !ocl list_copy (4,A) on the third line in FIG. 4) in the array copy method in the source program 1 is detected. When the array to be specified refers to list access, a work area of the array is reserved (for example, corresponding to [1] shown in FIG. 5), an instruction to make a specified number of copies of a target array to a work array is generated (for example, corresponding to [2] shown in FIG. 5), an instruction to determine the access position of a work array based on a list value is generated (for example, corresponding to [3] shown in FIG. 5), and list vector access based on a target array is changed into access based on a work array (for example, corresponding to [4] shown in FIG. 5).

Thus, the source program 1 shown in FIG. 4 is changed into a source program shown in FIG. 5. If it is compiled to generate and execute an object code, then a bank conflict can be reduced, and list access can be performed at a high speed. This array copy method is effective in avoiding a bank conflict especially when the same list value is included continuously as described later by referring to FIG. 5.

In the example of the source program shown in FIG. 4, the following optimization directive line on the third line shown in FIG. 4 is an optimization directive line in the array copy method.

!ocl list_copy (4,A)

The fourth and fifth lines indicate list access.

FIG. 5 shows an implement image of the source program shown in FIG. 4 where [1], [2], [3], and [4] show results of the above described [1], [2], [3], and [4] respectively in FIG. 3.

In FIG. 5, [1] is an instruction to reserve a work array WORK.

The first [2] is an instruction to make a copy 1 (first copy) to the work array WORK.

The second [2] is an instruction to make a copy 2 (second copy) to the work array WORK.

The third [2] is an instruction to make a copy 3 (third copy) to the work array WORK.

The fourth [2] is an instruction to make a copy 4 (fourth copy) to the work array WORK. [3] is an instruction to determine the access position of the work array WORK based on a list value [4] is an instruction to refer to the work array WORK.

Assuming that the number of memory banks is IM and the number of copies to the work array is J, the size SIZE of the first dimension of the two-dimensional work array WORK can be computed by, for example, the following equation.

SIZE=((N+J-2))/IM+1)×IM×J     (1)

where N indicates the size of the one-dimensional arrays A, B, and L. SIZE can be larger or smaller than the value in equation (1). For example, the SIZE can be computed by the following equation instead of equation (1).

SIZE=N+J-1     (2)

The size of the second dimension of the work array WORK matches the number J of copies.

FIG. 6 shows a vector execution image obtained by vectorizing the source program shown in FIG. 5. In this example, the DO loop shown in FIG. 5 is replaced with vector instructions.

Figure 7:
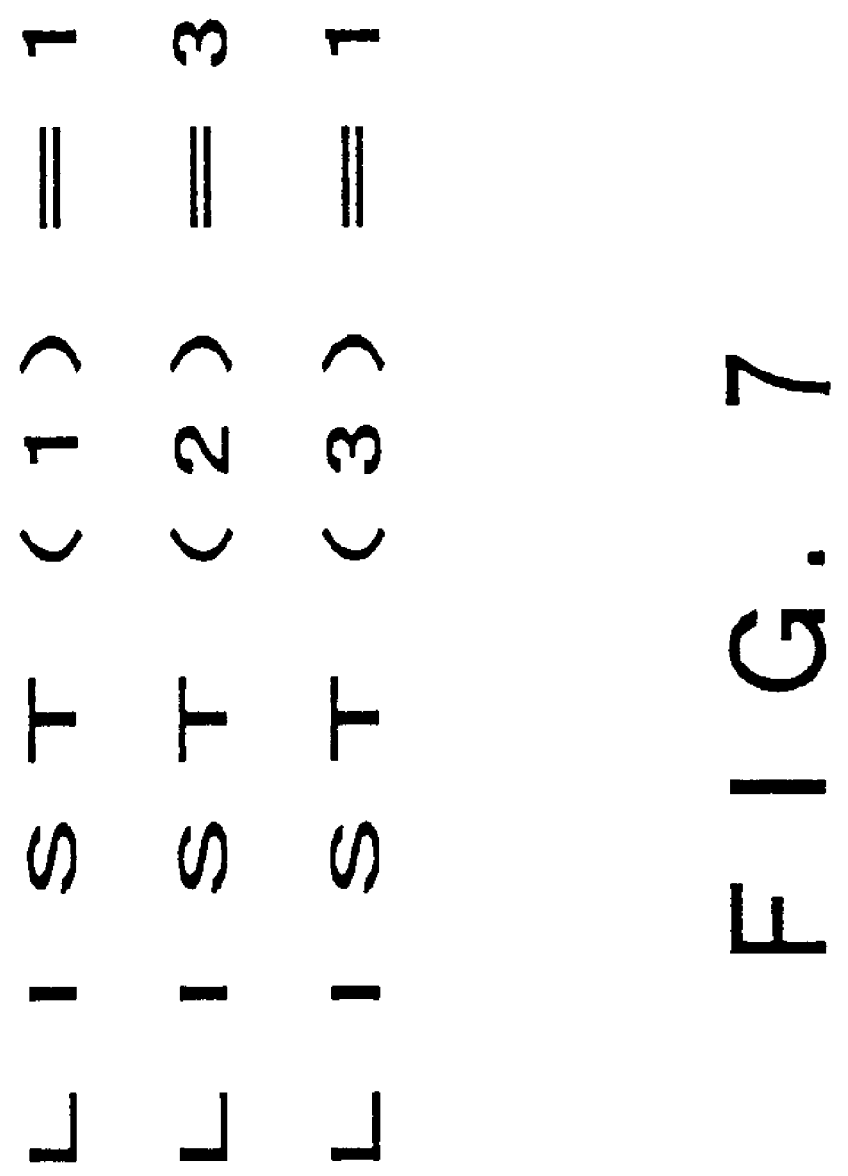

The operations of the array copy method are explained below by referring to a practical example. For simple explanation, the size of an array and the times of repetition of the DO loop in an example of a source program are set to 3 (N=3). The number of memory banks is 8, and the number of copies of the array is 4. The values of the array LIST is represented by the following equations as shown in FIG. 7.

LIST (1)=1

LIST (2)=3

LIST (3)=1

FIG. 8 shows an example of the memory access before a change. In this example, as shown in FIG. 8, the array LIST has values as shown in FIG. 7, and the elements A(1), A(2), and A(3) of the array A are stored in different banks. In this case, the list value corresponding to the repetition indices 1 and 3 of the DO loop is 1, and the element A(1) at the same position of the array A is accessed. Therefore, two requests to access the bank having A(1) are transmitted, thereby causing a bank conflict.

Figure 9:
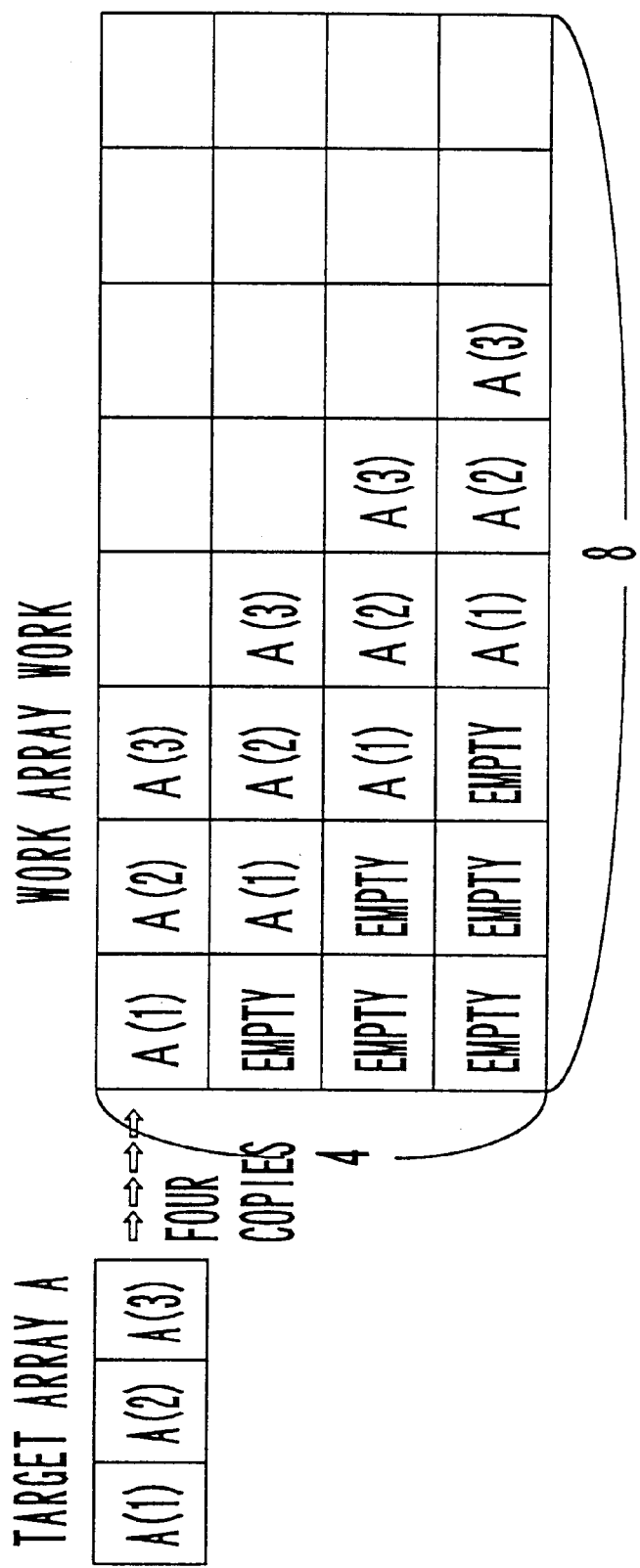
FIG. 9 shows copying an array.

FIG. 9 shows the operation of copying the target array A to the work array WORK. When the SIZE in equation (2) is used under N=3 and J=4, SIZE=6 holds. Since the obtained value is smaller than the number 8 of memory banks, the SIZE can be set to 8 without any problem. Therefore, the work array WORK (8, 4) can be reserved in memory. The indices 1, 2, 3, . . . , 8 of the first dimension of the work array WORK correspond to different banks.

The target array A is copied to a reserved area four times according to the instruction. At this time, the copies are made with the position of the leading element A(1) in the array A shifted one by one as shown in FIG. 9. As a result, a bank does not contain a plurality of the same elements.

FIG. 10 shows an example of memory access after a change. In this example, as shown in FIG. 10, the access position of the work array WORK can be determined at the instructions [3] and [4] shown in FIG. 5. Therefore, different banks in the array WORK are accessed even if the array LIST has the values as shown in FIG. 7 and A(1) is accessed for the repetition indices 1 and 3 of the DO loop, thereby avoiding a bank conflict.

As described above, the array copy method is effective when the same value exists continuously or appears repeatedly in a given list vector. However, there is the possibility that the times of access to the same bank increases by a certain value for a list even if the array copy method is adopted to avoid a bank conflict.

Figure 11:
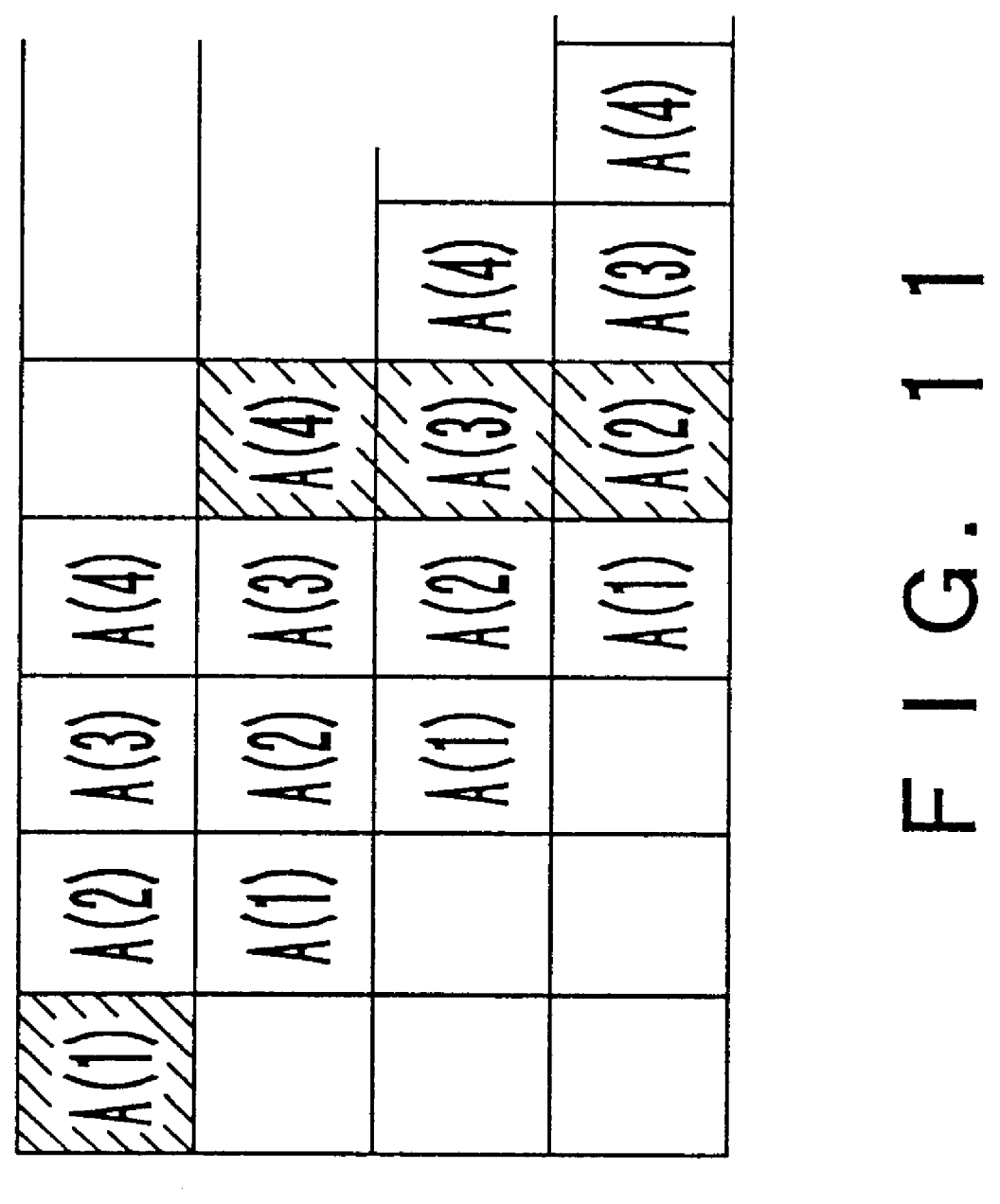

For example, if N=4, and the list value LIST (I)=4, 3, 2, 1 for I=1, 2, 3, and 4, then the work array WORK is set as shown in FIG. 11. In this case, if the access position is determined according to the instructions [3] and [4] shown in FIG. 5, then the four positions indicated by slashes are set as access targets, and the access to A(4), A(3), and A(2) falls into a conflict.

A random access method can avoid a bank conflict even in the above described case by setting the access order at random regardless of a value of a list vector.

The method of avoiding a bank conflict in the random access method is described below in detail by referring to FIGS. 12 through 15.

FIG. 12 is a flowchart showing the operations of the random access method.

In FIG. 12, the optimization control line analysis unit 5 analyzes an optimization directive line in step S11. For example, it is checked whether or not there is the following optimization directive line representing a random access method described on the third line of the source program shown in FIG. 13.

!ocl list_random (B)

The optimization directive line is described as a comment statement, and indicates a random access process to an array B.

In step S12, the optimization control line analysis unit 5 determines whether or not the random access method is specified. If yes, control is passed to step S13. If not, the process terminates without performing any process.

In step S13, the optimization control line analysis unit 5 determines whether or not the access to a specified target array refers to list access. In this example, it is determined whether or not the description of the access to an array in the random access method specified in step S12 refers to the list access. If yes, control is passed to step S14. If not, the process terminates without performing any process.

In step S14 ([1]), the changing unit 8 generates an instruction to generate a random access position (corresponding to [1] shown in FIG. 14).

In step S15 ([2]), the changing unit 8 changes all access in the repetition of a loop into the access position generated in [1] (corresponding to [2] shown in FIG. 14).

In the above described processes, an optimization directive line (for example, !ocl list_random (B) on the third line in FIG. 13) in the random access method in the source program 1 is detected. When the array to be specified refers to list access, an instruction to generate random access positions is generated (for example, corresponding to [1] shown in FIG. 14), and the position of list access is changed into the random access positions (for example, corresponding to [2] shown in FIG. 14).

Thus, the source program 1 shown in FIG. 13 is changed into a source program shown in FIG. 14. If it is compiled to generate and execute an object code, then a bank conflict can be reduced, and list access can be performed at a high speed. This random access method is effective in avoiding for a bank conflict especially when the same list value string comes continuously, for example, 4,3,2,1,4,3,2,1, etc.

In the example of the source program shown in FIG. 13, the following optimization directive line on the third line shown in FIG. 13 is an optimization directive line in the random access method.

!ocl list_random (B)

The fourth and fifth lines indicate list access.

FIG. 14 shows an implement image of the source program shown in FIG. 13 where [1] and [2] show results of the above described [1] and [2] respectively in FIG. 12.

In FIG. 14, RANDOM (I,N) of [1] is a generation function for a random access position. The generation function for a random access position generates a new index value IRANDOM from the times N of repetition of a loop and an original index value I. However, the generation function is set to generate different IRANDOM for N respective index values I.

[2] is an instruction to access the array B using IRANDOM instead of the index I.

FIG. 15 shows a vector execution image obtained by vectorizing the source program shown in FIG. 14. In this example, the DO loop shown in FIG. 14 is replaced with vector instructions.

The method of avoiding a bank conflict in the scalar load method is described in detail by referring to FIGS. 16 through 25.

Figure 16:
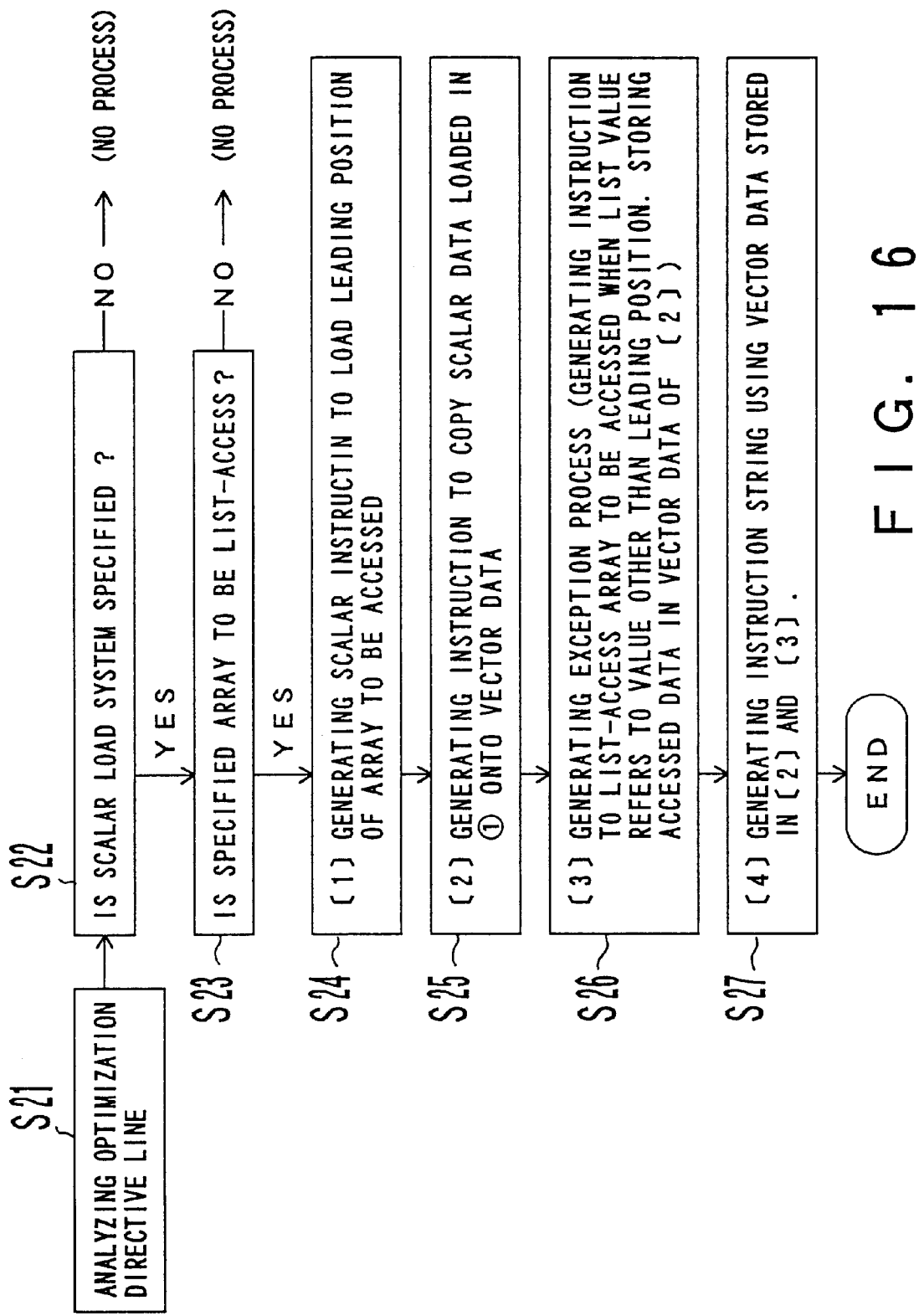
FIG. 16 is a flowchart showing the operations in the scalar load method.

FIG. 16 is a flowchart showing the operations of the scalar load method.

In FIG. 7, the optimization control line analysis unit 5 analyzes an optimization directive line in step S21. For example, it is checked whether or not there is the following optimization directive line representing a scalar load method described on the third line of the source program shown in FIG. 17.

!ocl list_vls (B)

The optimization directive line is described as a comment statement, and indicates a scalar load process for the value of an array B.

In step S22, the optimization control line analysis unit 5 determines whether or not the scalar load method is specified. If yes, control is passed to step S23. If not, the process terminates without performing any process.

In step S23, the optimization control line analysis unit 5 determines whether or not the access to a specified target array refers to list access. In this example, it is determined whether or not the description of the access to an array in the scalar load method specified in step S22 refers to the list access. If yes, control is passed to step S24. If not, the process terminates without performing any process.

In step S24 [1], the changing unit 8 generates a scalar instruction to load the leading position of a target array (corresponding to [1] shown in FIG. 8).

In step S25 [2], the changing unit 8 generates an instruction to copy the scalar data loaded in [1] to vector data (corresponding to [2] shown in FIG. 18).

In step S26 ([3]), the changing unit 8 generates an instruction to perform an exception process (corresponding to [3] shown in FIG. 18). In this example, an instruction is generated to gain list access to a target array only if the list value is different from the value of the leading position, and to store the accessed data in the vector data of [2].

In step S27 ([4]), the changing unit 8 generates an instruction string using the vector data of [2] and [3] (corresponding to [4] shown in FIG. 18).

In the above described processes, an optimization directive line (for example, !ocl list_vls (B) on the third line in FIG. 17) in the scalar load method in the source program 1 is detected. When the array to be specified refers to list access, a scalar instruction to load the leading position of a target array is generated (for example, corresponding to [1] shown in FIG. 18), an instruction to copy the scalar data loaded in [1] to the vector data (for example, corresponding to [2] shown in FIG. 18), an exception process is generated (corresponding to [3] shown in FIG. 18), and an instruction string using vector data is generated (corresponding to [4] shown in FIG. 18).

Thus, the source program 1 shown in FIG. 17 is changed into a source program shown in FIG. 18. If it is compiled to generate and execute an object code, then a bank conflict can be reduced, and list access can be performed at a high speed. When the same value continuously comes as a value of a list during the repetition of a DO loop, one scalar access instruction can be executed and the result can be applied to vector data with higher performance efficiency than access to an array using a list vector instruction. Therefore, the scalar load method is efficient especially in such a case.

The scalar load method accesses memory in only one scalar accessing process, uses the result after distributing it into vector data, and assumes a scalar access target at the leading position of an array. Furthermore, it generates an exception mask in an exception process in consideration of the appearance of a list value different from the value of the leading position, and accesses array data at a corresponding position through a normal list vector instruction.

In an example of a source program shown in FIG. 17, the following description on the third line is an optimization directive line in the scalar load method.

!ocl list_vls (B)

where the fourth and the fifth lines are list access lines.

FIG. 18 shows an implement image of the source program shown in FIG. 17 where [1], [2], [3], and [4] show results of the above described [1], [2], [3], and [4] respectively in FIG. 18.

In FIG. 18, [1] is a scalar load instruction whose list values are assumed to be all '1'.

[2] is a transfer instruction to vector data.

[3] is an instruction to perform an exception process.

[4] is an instruction string to store vector data in memory.

FIG. 19 shows a vector execution image obtained by vectorizing the source program shown in FIG. 18. In this example, the DO loop shown in FIG. 18 is replaced with vector instructions.

The operations of the scalar load method are explained below by referring to a practical example. For simple explanation, the size of an array and the times of repetition of the DO loop in this example of a source program are set to 8 (N=8). The number of memory banks is 8. It is assumed that the processing unit 2 contains a scalar register, a vector register, and a mask register.

The array B and the list vector array L are assumed to have the elements shown in FIG. 20, and the elements are stored in the respective banks. The value of the element of the array L is 1 except L(4) and L(8).

Figure 21:
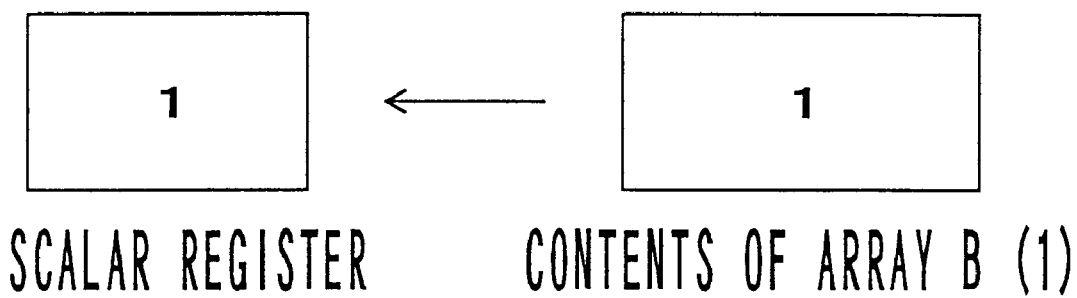
FIG. 21 shows copying to a scalar register.

S When (a) shown in FIG. 19 is executed, the contents of the array B (1) are loaded onto the scalar register as shown in FIG. 21.

Figure 22:
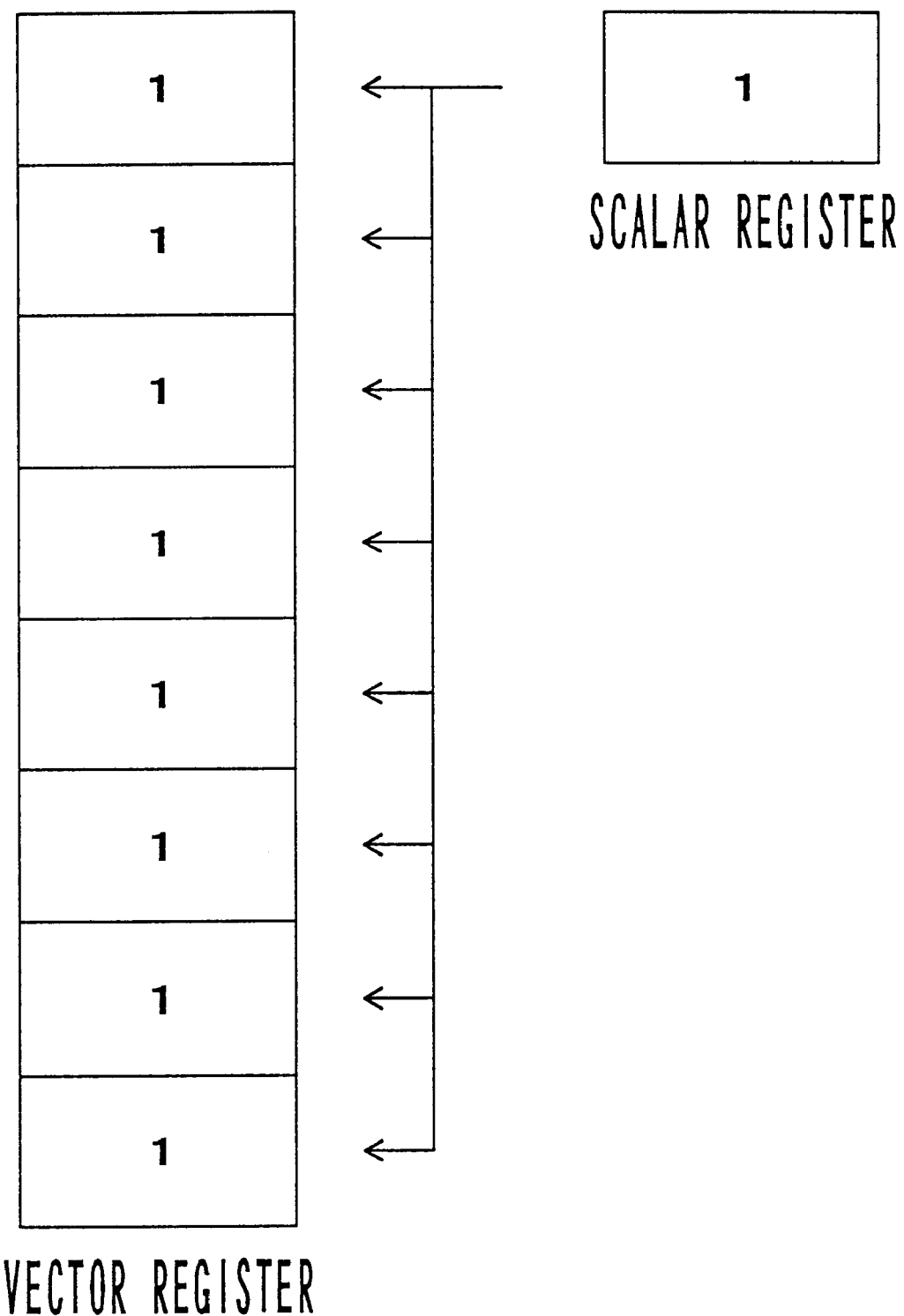
FIG. 22 shows copying to a vector register.

When (b) shown in FIG. 19 is executed, the data in the scalar register are copied to all elements in the vector register as shown in FIG. 22.

When (c) shown in FIG. 19 is executed, each element in the array L is compared with 1 as shown in FIG. 23. For an element whose value is 1, the mask data 'false' is stored at the corresponding position in the mask register whereas for an element whose value is other than 1, the mask data 'true' is stored at the corresponding position in the mask register.

When (d) shown in FIG. 19 is executed, the value of the vector register is amended depending on the value of the mask register as shown in FIG. 24. In this example, the array B is vector accessed using the value 2 of L(4) and the value 3 of L(8) corresponding to the positions of 'true' of the mask data, thereby rewriting the corresponding elements in the vector register.

Figure 25:
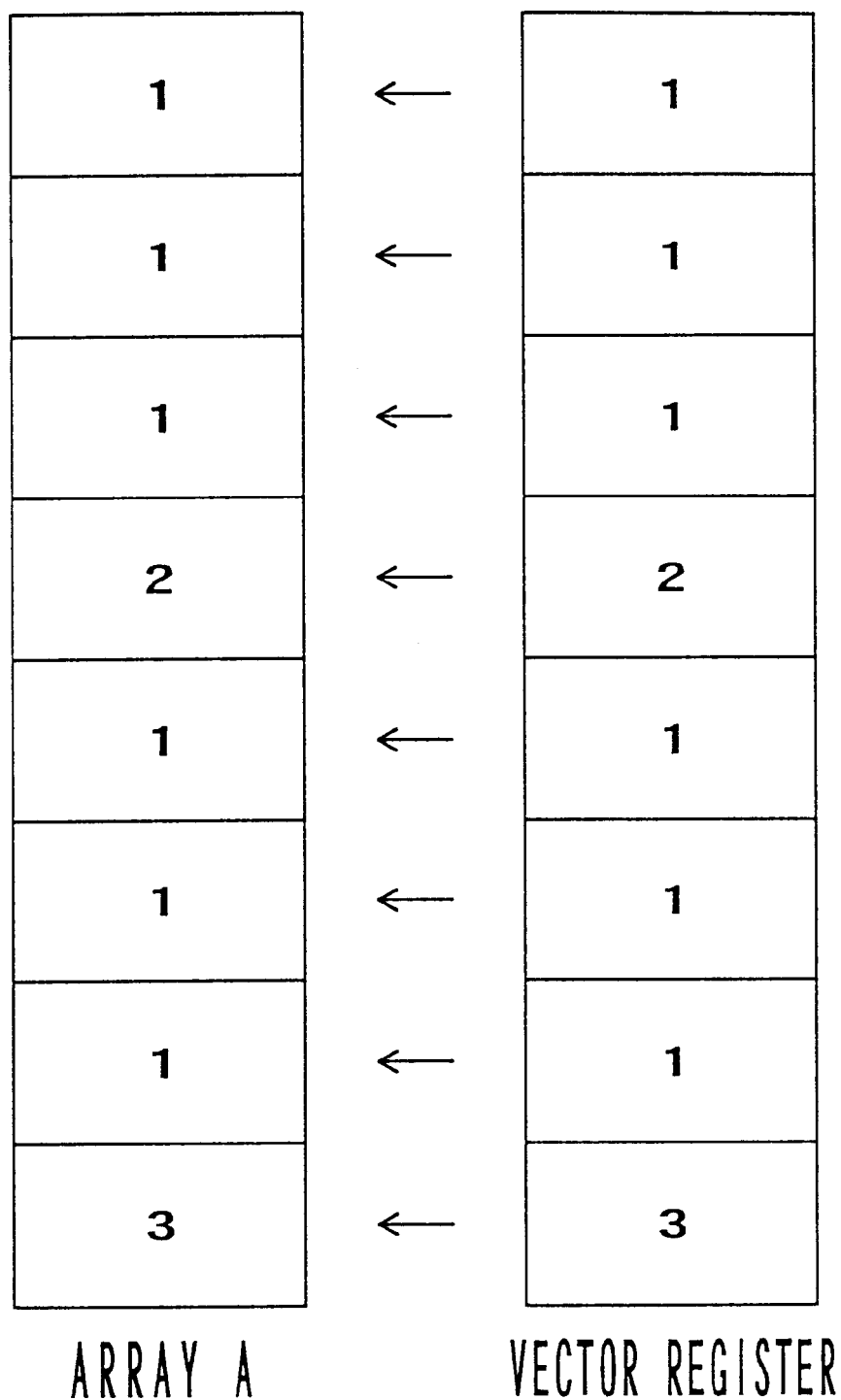
FIG. 25 shows storing in an array A.

When (e) shown in FIG. 19 is executed, data is stored from the vector register to the array A as shown in FIG. 25.

In this example, the data at the leading position of the array B is a target of scalar load. However, another specific position in the array B can be a target of scalar load. Normally, access efficiency can be optimized if the position corresponding to the most frequent list value contained as an element of the array L is set as the target position of the scalar load.

As described above, the memory access method according to the present embodiment can be the array copy method, the random access method, and the scalar load method. A user can try any of these methods for a list described in the source program to adopt the most efficient method. Furthermore, a different method can be specified for each loop process by inserting the optimization directive line before each loop process.

Additionally, the optimization directive line which specifies the access method does not have to be a comment statement, but can optionally define and use an appropriate command, etc.

Industrial Applicability

According to the present invention, an optimization directive line for optimizing the list access method is inserted into a source program when a program is being compiled by a vector computer. According to an instruction in the optimization directive line, data to be accessed can be automatically copied to a work array, the access order can be changed at random, a scalar load process can be performed, etc. Therefore, high-speed list access can be realized without user's tuning a source program and a bank conflict at a vectorization.

What is claimed is:

1. A process method for compiling a given source program and generating a code, comprising:

analyzing the source program during compilation;

detecting a change instruction to change an access method for an array to be accessed in the source program, an access position of the array to be accessed being indicated by a list value in a list array and an index of the list array corresponding to a loop index which specifies repetition of a loop to access the array to be accessed;

changing the access method for the array to be accessed in the source program according to the change instruction, in a manner that at least a part of access positions for different values of the loop index are respectively included in different memory banks, when the change instruction is detected in the source program; and generating a code corresponding to the changed access method.

2. The method according to claim 1, wherein the access method is changed by generating an instruction to generate a plurality of copies of the array to be accessed in a work array, in a manner that access positions of the copies corresponding to a same access position of the array to be accessed are respectively included in different memory banks, and change access to the array to be accessed into access to the work array.

3. The method according to claim 1, wherein the access position of the array to be accessed is changed into different access positions at random respectively for different values of a loop index, the loop index specifying repetition of a loop to access the array to be accessed.

4. The method according to claim 1, wherein the access method is changed by generating an instruction to scalar-load data from a specific position in the array to be accessed and copy the loaded data to each element of a vector data.

5. A memory access apparatus comprising:

a unit detecting an array to be accessed in a source program during compilation, an access position of the array to be accessed being indicated by a list value in a list array;

a unit generating and inserting an instruction to generate a plurality of copies of the array to be accessed in a work array, in a manner that access positions of the copies corresponding to a same access position of the array to be accessed are respectively included in different memory banks, when the array to be accessed is detected in the source program during compilation;

a unit generating and inserting an instruction to determine an access position of the work array based on the list value; and a unit changing access based on the array to be accessed into access based on the work array.

6. A memory access apparatus comprising:

a unit detecting an array to be accessed in a source program during compilation, an access position of the array to be accessed being indicated by a list value in a list array;

a unit generating and inserting an instruction to generate different access positions at random respectively for different values of a loop index, the loop index specifying repetition of a loop to access the array to be accessed, when the array to be accessed is detected in the source program during compilation; and a unit changing access depending on the repetition of the loop into access based on the generated access positions.

7. A memory access apparatus comprising:

a unit detecting an array to be accessed in a source program during compilation, an access position of the array to be accessed being indicated by a list value in a list array;

a unit generating and inserting a scalar instruction to load scalar data of a leading position of the array to be accessed when the array to be accessed is detected in the source program during compilation;

a unit generating and inserting an instruction to copy the loaded scalar data to each element of vector data representing data of the detected array to be accessed; and a unit generating and inserting an instruction string for processing the vector data.

8. A processing unit comprising:

an analysis unit detecting that a change instruction to change an access method for an array to be accessed in a source program is described in the source program, an access position of the array to be accessed being indicated by a list value in a list array and an index of the list array corresponding to a loop index which specifies repetition of a loop to access the array to be accessed;

a change unit changing the access method for the array to be accessed in the source program according to the change instruction, in a manner that at least a part of access positions for different values of the loop index are respectively included in different memory banks, when the change instruction is detected in the source program; and a generation unit generating and outputting a code corresponding to the changed access method.

9. The processing unit according to claim 8, wherein said change unit generates an instruction to generate a plurality of copies of the array to be accessed in a work array, in a manner that access positions of the copies corresponding to a same access position of the array to be accessed are respectively included in different memory banks, and change access to the array to be accessed into access to the work array.

10. The processing unit according to claim 8, wherein said change unit changes the access position of the array to be accessed into different access positions at random respectively for different values of a loop index, the loop index specifying repetition of a loop to access the array to be accessed.

11. The processing unit according to claim 8, wherein said change unit generates an instruction to scalar-load data from a specific position in the array to be accessed, and copy the loaded data to each element of a vector data.

12. A computer-readable storage medium storing a program to direct a computer to perform:

detecting that a change instruction to change an access method for an array to be accessed in a source program is described in the source program, an access position of the array to be accessed being indicated by a list value in a list array and an index of the list array corresponding to a loop index which specifies repetition of a loop to access the array to be accessed; and changing the access method for the array to be accessed in the source program according to the change instruction, in a manner that at least a part of access positions for different values of the loop index are respectively included in different memory banks, when the change instruction is detected in the source program; and when the change instruction is detected in the source program.

13. The medium according to claim 12, wherein said program generates an instruction to generate a plurality of copies of the array to be accessed in a work array and change access to the array, in a manner that access positions of the copies corresponding to a same access position of the array to be accessed are respectively included in different memory banks, to be accessed into access to the work array.

14. The medium according to claim 12, wherein said program changes the access position of the array to be accessed into different access positions at random respectively for different values of a loop index, the loop index specifying repetition of a loop to access the array to be accessed.

15. The medium according to claim 12, wherein said program generates an instruction to scalar-load data from a specific position in the array to be accessed, and copy the loaded data to each element of a vector data.

* * * * *